May 15, 1923.
V. E. NICOLAIDES
PORTABLE HEAD FOR IRRIGATION RISERS
Filed July 29, 1920
1,455,406
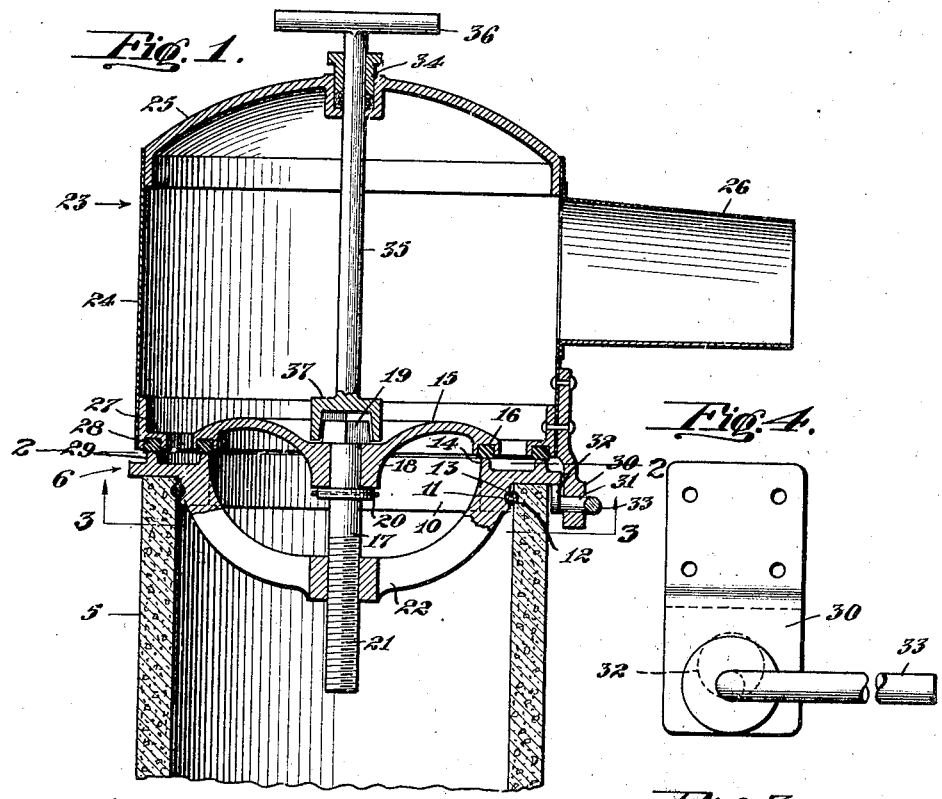
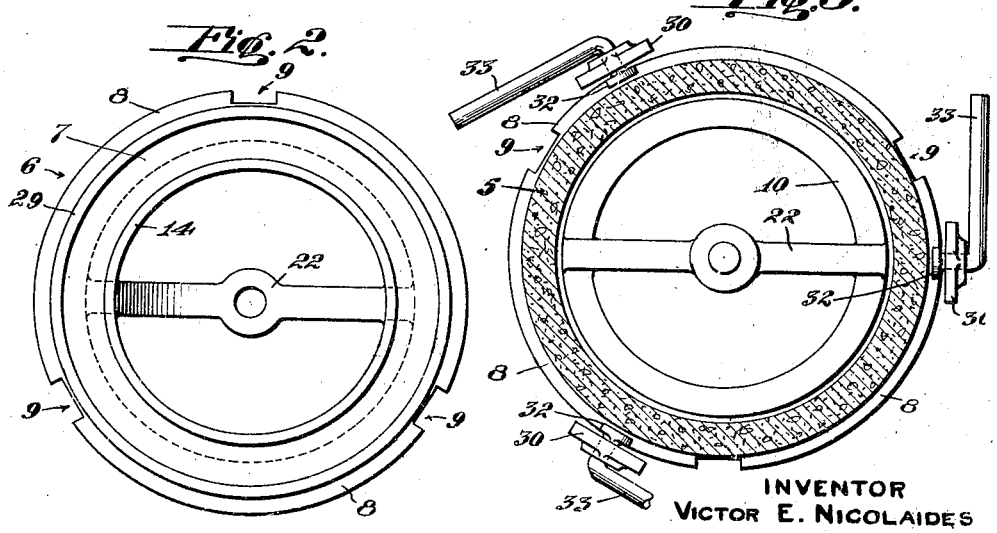
INVENTOR
VICTOR E. NICOLAIDES
BY
ATTORNEY Patented May 15, 1923.

1,455,406

UNITED STATES PATENT OFFICE.

VICTOR E. NICOLAIDES, OF LANCASTER, CALIFORNIA.

PORTABLE HEAD FOR IRRIGATION RISERS.

Application filed July 29, 1920. Serial No. 399,792.

*To all whom it may concern:*

Be it known that I, VICTOR E. NICOLAIDES, a citizen of the United States, residing at Lancaster, in the county of Los Angeles and State of California, have invented new and useful Improvements in Portable Heads for Irrigation Risers, of which the following is a specification.

This invention particularly pertains to a hydrant which is especially adapted for use on the stand-pipes of irrigation lines and detachably secured thereto, and which is employed for the purpose of controlling and directing the flow of water from the stand-pipe.

In the construction of irrigation systems, pipe lines are laid in the ground from a suitable source of water supply to various portions of a field or area to be irrigated, and stand-pipes or risers are arranged at desired intervals in the pipe line for delivering water onto the surface of the ground adjacent the stand-pipe. The stand-pipes are ordinarily open at their upper ends and are fitted with cut-off valves arranged across the opening in such manner that on opening the valve the water will discharge laterally all around the stand-pipe; the valves permitting the closing and opening of any of the stand-pipes in a series so that the water may be cut off at some points in the system and allowed to flow in others according to requirements or convenience.

It is the object of this invention to provide a hydrant which may be readily attached to a stand-pipe or removed therefrom, and which may be easily carried from one stand-pipe to another in the series according to which one is to be employed in discharging the water, so that one hydrant will serve for any number of stand-pipes and thus obviating providing a hydrant for each stand-pipe.

Another object is to provide a construction whereby the hydrant may be readily turned, so that the spout or discharge portion thereof may be positioned to extend at any desired point around the stand-pipe.

A further object is to provide a simple and effective means whereby the valve in the stand-pipe may be operated through the hydrant.

Other objects will appear hereinafter.

The invention is illustrated in the accompanying drawings, in which:

Figure 1 is a view in vertical cross section showing the hydrant as detachably secured in place on a stand-pipe and showing the means for operating the valve.

Figure 2 is a plan view of the valve seat member adapted to be permanently mounted on the stand-pipe as seen on line 2—2 of Figure 1.

Figure 3 is a detail inverted horizontal section as seen on the line 3—3 of Figure 1.

Figure 4 is a detail in elevation showing one of the clamps for detachably connecting the hydrant to the stand-pipe.

More specifically, 5 indicates a stand-pipe which is here shown as formed of concrete or tile, but which may be formed of wood, metal, or any suitable material, and 6 indicates a metallic rim adapted to seat on the upper end of the stand-pipe 5 and is preferably permanently attached thereto. The rim 6 comprises an annulus 7 which seats on the upper edge of the stand-pipe and has projecting flanges 8 which extend beyond the outer face of the stand-pipe; the projecting portions 8 being spaced apart by openings or channels 9. The rim is formed with a downwardly extending flange 10 adapted to project into the stand-pipe and to be secured thereto; the flange 10 being here shown as formed with a peripheral channel 11 disposed opposite a channel 12 on the inner face of the stand-pipe, which channels are filled with a cement 13 by which the rim is anchored on the stand-pipe and the joint between the rim and stand-pipe sealed against leakage. Formed on the inner margin of the rim is an upwardly extending flange constituting a valve seat 14 on which an upwardly opening disk valve 15 is adapted to rest; the valve being provided with a packing ring 16 arranged to bear on the flange 14. The valve 15 is mounted on a valve stem 17 on which it is turnable; the valve stem projecting through a hub 18 on the valve and having a staight sided head 19 adapted to seat on the upper face of the valve and having a collar 20 at the inner end of the hub 18 between which head and collar the valve is carried. The lower end of the valve stem is threaded, as indicated at 21 and screwed into a yoke 22 formed on the rim. The valve may be opened or closed by rotating the stem to advance or retract it in its threaded bearing.

23 indicates the hydrant which embodies a cylindrical wall 24, a top wall 25, and a spout 26 projecting from one side thereof; an inturned flange 27 being formed on the lower edge of the wall 24 and fitted with a packing ring 28 adapted to seat on an annular upturned flange 29 formed on the rim 6 concentric with and spaced from the valve seat flange 14. Mounted on hangers 30 carried by the hydrant, is a series of radially disposed rock shafts 31 on the inner ends of which cams 32 are mounted, and the outer ends of which are formed with handles 33 by which they may be turned to rotate the cams 32. The rock shafts and cams are here shown as three in number and disposed equidistant apart and so positioned that the cams 32 may pass through the openings 9 in setting the hydrant in place on the rim to position the cams below the projections 8; the hydrant being adapted to be turned to any desired position on the rim with the cams out of engagement therewith, to secure the hydrant on the rim the cams are turned by operating the handles 33 to engage the underside of the projections 8 and thereby clamp the hydrant in position. Extending through a packing gland 34 in the top of the hydrant is a stem 35, the upper end of which is fitted with a handle 36 and the lower end fitted with a socket 37 adapted to extend over and engage the head 19 of the valve stem 17 in such manner that on rotation of the stem 36 the valve stem may be rotated to open or close the valve.

The operation of the invention is apparent from the foregoing, it being seen that the hydrant may be readily placed on the stand-pipe and secured thereto by engaging the cams with the over-hanging or projecting portions of the rim 6 and that it may be readily removed by turning the cams to a disengaging position and thereafter rotating the hydrant to dispose the cams opposite the openings 9 whereupon the hydrant may be lifted clear of the stand-pipe. The stem 35 being slidable lengthwise and the packing gland 34 permits it being readily engaged with the valve stem and by employing the socket 37 the stem 35 will be free from engagement with the valve stem on lifting the hydrant clear of the rim.

While I have shown and described a specific embodiment of my invention, I do not limit myself to the exact details of construction shown, but may employ such changes or modifications as occasion may require coming within the scope of the appended claims.

I claim:

1. The combination of a stand-pipe, a rim carried by the stand-pipe, spaced projections on said rim extending outwardly from the stand-pipe, a valve seating on said rim for closing the stand-pipe, a hydrant adapted to seat on said rim, means on said hydrant for operating said valve, and a series of cams on said hydrant engageable with the underside of projections on said rim for detachably connecting the hydrant on said rim, said cams being adapted to be passed through the spaces between the projections whereby the cams will be positioned on a plane below the projections in positioning the hydrant on said rim, said hydrant being adapted to be turned to dispose the cams beneath the projections.

2. The combination of a stand-pipe, a rim carried by the stand-pipe, spaced projections on said rim extending outwardly from the stand-pipe, a valve seating on said rim for closing the stand-pipe, a hydrant adapted to seat on said rim, means on said hydrant for operating said valve, a series of rock shafts carried by said hydrant, cams on said rock shafts engageable with the underside of projections on said rim for detachably connecting the hydrant to the rim, said cams being adapted to be passed through the spaces between the projections whereby the cams will be positioned on a plane below the projections in positioning the hydrant on said rim, said hydrant being adapted to be turned to dispose the cams beneath the projections.

3. The combination with a stand-pipe of a rim secured to said stand-pipe, a valve adapted to seat on said rim, a threaded valve stem on which said valve is mounted, a yoke on said rim through which said threaded stem is screwed, a fixed head on said valve stem, a demountable hydrant adapted to seat on said rim and to extend over said valve, means for detachably clamping said hydrant on said rim engageably with the rim and a stem slidably and revolvably mounted in said hydrant having a socket adapted to detachably engage the fixed head of said valve stem, whereby rotation of said stem will effect rotation of the valve stem.

VICTOR E. NICOLAIDES.